United States Patent
Hein et al.

(10) Patent No.: US 10,063,926 B2
(45) Date of Patent: *Aug. 28, 2018

(54) METHODS AND SYSTEMS FOR IDENTIFYING DISTRIBUTION OPPORTUNITIES BASED ON ADJACENT KEYWORDS

(71) Applicant: Pixability, Inc., Boston, MA (US)

(72) Inventors: Bettina Hein, Cambridge, MA (US); Andreas Goeldi, Cambridge, MA (US)

(73) Assignee: Pixability, Inc., Boston, MA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/239,861

(22) Filed: Aug. 18, 2016

(65) Prior Publication Data

US 2016/0360272 A1 Dec. 8, 2016

Related U.S. Application Data

(63) Continuation of application No. 13/873,336, filed on Apr. 30, 2013, now Pat. No. 9,449,089.

(Continued)

(51) Int. Cl.
*G06F 17/30* (2006.01)
*H04N 21/466* (2011.01)
(Continued)

(52) U.S. Cl.
CPC ..... *H04N 21/4668* (2013.01); *G06F 17/3005* (2013.01); *G06F 17/3082* (2013.01);
(Continued)

(58) Field of Classification Search
CPC ......... G06F 17/30828; G06F 17/30867; G06F 17/30029; G06F 17/30256;
(Continued)

(56) References Cited

U.S. PATENT DOCUMENTS 8,234,271 B2 * 7/2012 Bahlmann .......... H04N 21/2355
707/722
8,248,940 B2 * 8/2012 Gassewitz ............... H04L 43/00
370/235

(Continued)

OTHER PUBLICATIONS

Non-Final Rejection dated Dec. 2, 2015, issued in related U.S. Appl. No. 13/873,336, filed Apr. 30, 2013, Hein et al., 15 pages.

(Continued)

*Primary Examiner* — Michelle Owyang
(74) *Attorney, Agent, or Firm* — Cynthia M. Gilbert; Blueshift IP, LLC

(57) ABSTRACT

A computer-implemented method includes receiving, by a first computing device, an identification of a video and an identification of a distribution channel of the video. The method includes retrieving, by the first computing device, from a video sharing network, metadata associated with a video. The method includes retrieving, by the first computing device, from a second computing device in a second network, data having at least one characteristic in common with the metadata. The method includes generating, by the first computing device, a profile of the video based on the retrieved data and the metadata. The method includes generating, by the first computing device, a profile of the distribution channel based on the retrieved data and metadata. The first computing device generates a recommendation for a method to increase a level of distribution of the video. The first computing device provides, to a user, the recommendation.

9 Claims, 14 Drawing Sheets

Related U.S. Application Data

(60) Provisional application No. 61/643,789, filed on May 7, 2012.

(51) Int. Cl.
  *H04N 21/25* (2011.01)
  *H04N 21/482* (2011.01)
  *H04N 21/84* (2011.01)
  *H04N 21/438* (2011.01)
  *H04N 21/44* (2011.01)

(52) U.S. Cl.
  CPC .. *G06F 17/30784* (2013.01); *G06F 17/30817* (2013.01); *G06F 17/30837* (2013.01); *G06F 17/30864* (2013.01); *H04N 21/252* (2013.01); *H04N 21/4383* (2013.01); *H04N 21/44008* (2013.01); *H04N 21/4826* (2013.01); *H04N 21/84* (2013.01)

(58) Field of Classification Search
  CPC ........... G06F 17/30817; G06F 17/3082; G06F 17/30017; G06F 17/30781
  USPC ................................ 707/600–899; 725/1–153
  See application file for complete search history.

(56) References Cited

U.S. PATENT DOCUMENTS

| | | |
|---|---|---|
| 8,935,713 B1 | 1/2015 | Gabel et al. |
| 2006/0161952 A1 | 7/2006 | Herz et al. |
| 2006/0271594 A1 | 11/2006 | Haberman |
| 2007/0250861 A1 | 10/2007 | Angiolillo et al. |
| 2007/0250901 A1 | 10/2007 | McIntire et al. |
| 2007/0277205 A1 | 11/2007 | Grannan |
| 2008/0301737 A1 | 12/2008 | Almas et al. |
| 2009/0019486 A1 | 1/2009 | Kalaboukis |
| 2009/0083326 A1 | 3/2009 | Pelton |
| 2009/0132595 A1 | 5/2009 | Yang et al. |
| 2009/0133059 A1 | 5/2009 | Gibbs et al. |
| 2010/0186041 A1 | 7/2010 | Chu et al. |
| 2010/0235438 A1 | 9/2010 | Narayanan et al. |
| 2011/0125861 A1 | 5/2011 | Evans et al. |
| 2011/0282745 A1 | 11/2011 | Meoded et al. |
| 2013/0312052 A1 | 11/2013 | Higgs |
| 2014/0259038 A1 | 9/2014 | Belyaev et al. |

OTHER PUBLICATIONS

Notice of Allowance dated May 20, 2016, issued in related U.S. Appl. No. 13/873,336, filed Apr. 30, 2013, Hein et al., 14 pages.

* cited by examiner

200

Topic Space Metrics

7,214,965,771 total views from 242,352 relevant videos
288,598,830 estimated monthly views Traffic Sources

| | |
|---|---|
| Mobile and Direct Traffic | 47% |
| Related videos | 22% |
| Subscribers | 9% |
| Search | 8% |
| Advertising | 3% |
| Other YouTube pages | 2% |
| Embedded | 2% |
| Social Media | 2% |

Top Demographic Segments

| | |
|---|---|
| Female 13-17 | 32% |
| Female 18-24 | 26% |
| Female 25-34 | 16% |
| Female 35-44 | 4% |
| Female 45-64 | 3% |

Traffic numbers and demographic segments are an approximation and subject to data availability from YouTube. The numbers are based on sampling of all available traffic information and might not add up to the total number of views.

| Traffic sources (if known): | | |
|---|---|---|
| Mobile and Direct Traffic | 2,274,895 | 51% |
| Subscribers | 917,708 | 20% |
| Related videos | 723,563 | 16% |
| Search | 330,089 | 7% |
| Other YouTube pages | 108,253 | 2% |
| Embedded | 25,200 | 0% |
| Social Media | 0 | 0% |
| External link | 0 | 0% |
| Advertising | 0 | 0% |

*Fig. 2F*

METHODS AND SYSTEMS FOR IDENTIFYING DISTRIBUTION OPPORTUNITIES BASED ON ADJACENT KEYWORDS

CROSS-REFERENCE TO RELATED APPLICATIONS

This application claims priority from U.S. Provisional Patent Application Ser. No. 61/643,789, filed on May 7, 2012, entitled "Methods and Systems for Identifying Distribution Opportunities," and to U.S. patent application Ser. No. 13/873,336, filed on Apr. 30, 2013, entitled "Methods and Systems for Identifying Distribution Opportunities," each of which is hereby incorporated by reference.

BACKGROUND

The disclosure relates to data distribution. More particularly, the methods and systems described herein relate to identification of opportunities to increase a level of distribution of data.

Conventional methods for identifying opportunities to increase a level of distribution of data typically focus on analyzing an attribute of the data itself. However, such typical methods may be limited in the ability to identify additional opportunities for increasing a level of distribution of the data since such conventional systems do not typically provide functionality for analyzing other potentially relevant types of data.

BRIEF SUMMARY

In one aspect, a computer-implemented method includes receiving, by a first computing device, an identification of metadata of a video, the received metadata including at least one keyword. The method includes retrieving, by the first computing device, from a video sharing network, second metadata of the video based on the received metadata, wherein the video sharing network includes at least one distribution channel for distributing the video for display on a viewer computing device, and wherein the second metadata includes at least one description of a characteristic of at least one of the video and the at least one distribution channel. The method includes retrieving, by the first computing device, from a second computing device in a second network different from the video sharing network, data having at least one characteristic in common with at least one of the received metadata, and the retrieved second metadata. The method includes generating, by the first computing device, a profile of the video based on the received metadata, the retrieved data, and the retrieved second metadata. The method includes generating, by the first computing device, a profile of the at least one distribution channel based on the received metadata, the retrieved data, and the received second metadata. The method includes analyzing, by the first computing device, the profile of the video. The method includes analyzing, by the first computing device, the profile of the distribution channel. The method includes identifying, by the first computing device, at least one channel adjacent to the distribution channel based on the analyses, wherein identifying further comprises: searching for the at least one channel adjacent to the distribution channel, in the video sharing network, having at least one characteristic in common with at least one characteristic identified in at least one of the profile of the video and the profile of the distribution channel. The method includes generating, by the first computing device, a recommendation for a method to increase a level of distribution of the video, wherein the recommendation includes distributing the video in the at least one channel adjacent to the distribution channel based on the analyses and channel identification. The method includes providing, by the first computing device, to a user, the recommendation.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2C is a screen shot depicting one embodiment of a plurality of aggregated metrics associated with a particular topic;

FIG. 2F is a screen shot depicting one embodiment of a display of a plurality of traffic sources used by a particular distribution channel;

FIG. 2I is a screen shot depicting one embodiment of a recommendation interface;

DETAILED DESCRIPTION

In some embodiments, the methods and systems described herein provide functionality for identifying distribution opportunities based on adjacent keywords. Before describing these methods and systems in detail, however, a description is provided of a network in which such methods and systems may be implemented.

Figure 1A:
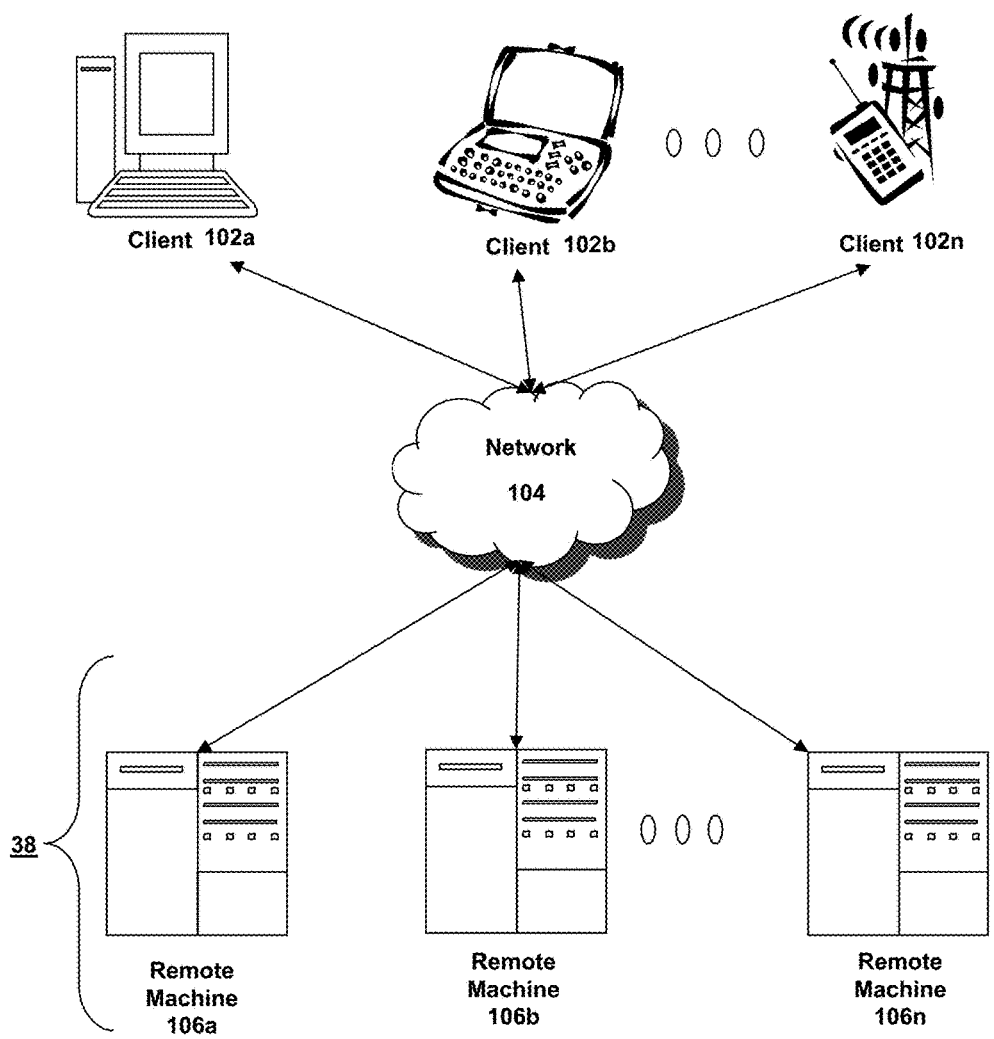
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 comprises an open-source web server such as the APACHE servers maintained by the Apache Software Foundation of Delaware. In other embodiments, the web server executes proprietary software such as the Internet Information Services products provided by Microsoft Corporation of Redmond, Wash., the Oracle iPlanet web server products provided by Oracle Corporation of Redwood Shores, Calif., or the BEA WEBLOGIC products provided by BEA Systems of Santa Clara, Calif. In further embodiments, a computing device 106 executes self-replication software. In one of these embodiments, execution of the self-replication software allows a computing device 106a to direct a second computing device 106b to provide a copy of data stored by the computing device 106. For example, the computing device 106a may provide access to a web site and, upon execution of the self-replication software, direct the second computing device 106b to provide access to a copy of the web site.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
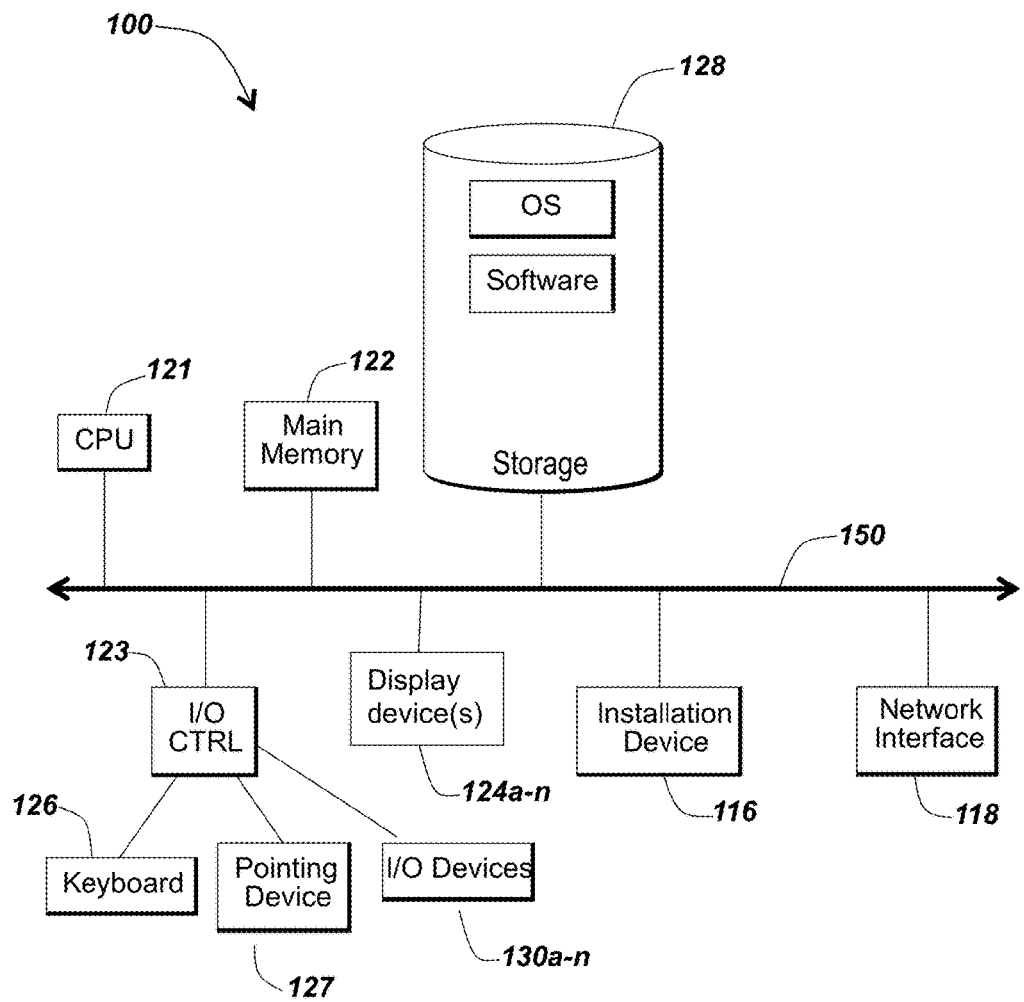
Figure 1C:
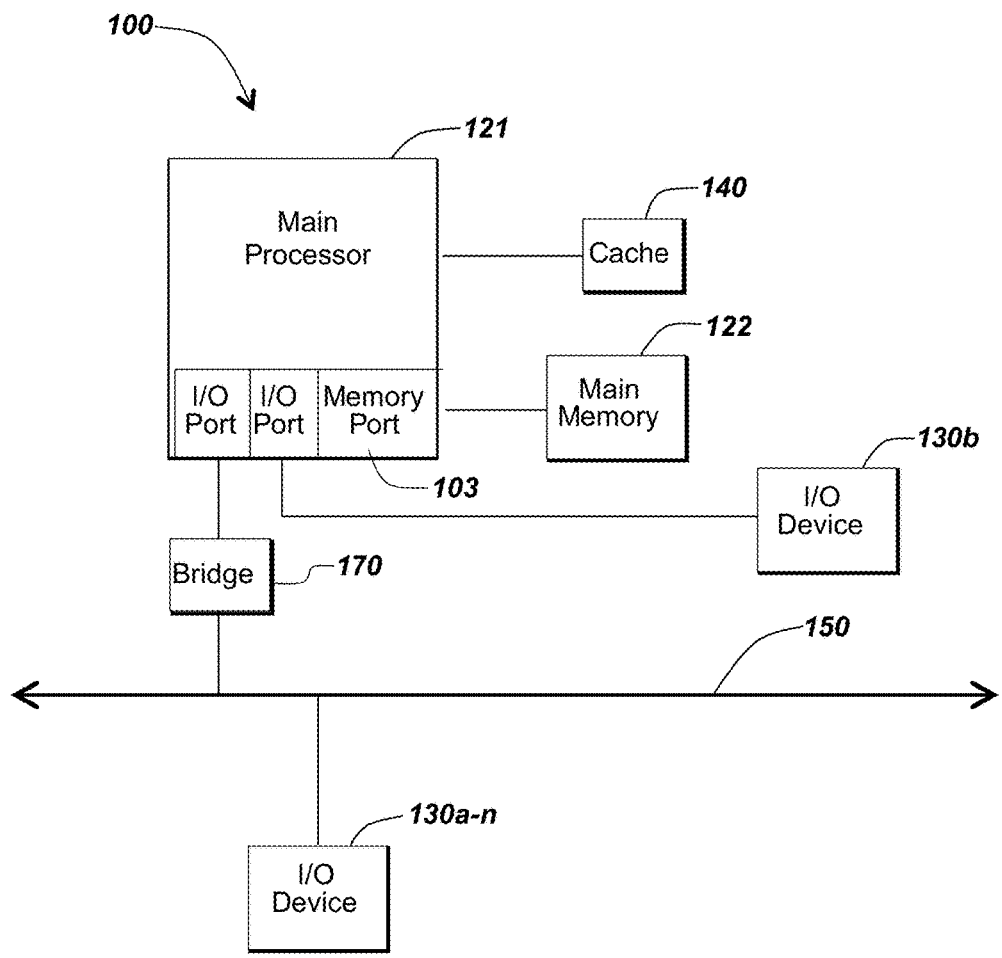

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. An I/O controller 123 as shown in FIG. 1B may control the I/O devices. Furthermore, an I/O device may also provide storage and/or an installation device 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, each of which may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS VISTA, all of which are manufactured by Microsoft Corporation of Redmond, Wash.; MAC OS, manufactured by Apple Inc. of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device such as a JAVA-enabled cellular telephone or personal digital assistant (PDA). The computing device 100 may be a mobile device such as those manufactured, by way of example and without limitation, by Motorola Corp. of Schaumburg, Ill.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smart phone, Pocket PC, Pocket PC Phone, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc. of Cupertino, Calif. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., Motorola Inc. of Schaumburg, Ill., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices such as a mobile phone combined with a digital audio player or portable media player. In one of these embodiments, the computing device 100 is a device in the Motorola line of combination digital audio players and mobile phones. In another of these embodiments, the computing device 100 is a device in the iPhone smartphone line of devices manufactured by Apple Inc. of Cupertino, Calif. In still another of these embodiments, the computing device 100 is a device executing the Android open source mobile phone platform distributed by the Open Handset Alliance; for example, the device 100 may be a device such as those provided by Samsung Electronics of Seoul, Korea or HTC Headquarters of Taiwan, R.O.C. In other embodiments, the computing device 100 is a tablet device such as, for example and without limitation, the iPad line of devices manufactured by Apple Inc.; the PlayBook manufactured by Research in Motion; the Cruz line of devices manufactured by Velocity Micro, Inc. of Richmond, Va.; the Folio and Thrive line of devices manufactured by Toshiba America Information Systems, Inc. of Irvine, Calif.; the Galaxy line of devices manufactured by Samsung; the HP Slate line of devices manufactured by Hewlett-Packard; and the Streak line of devices manufactured by Dell, Inc. of Round Rock, Tex.

In some embodiments, the methods and systems described herein provide functionality for identifying distribution opportunities. In one of these embodiments, individuals distributing data may use the methods and systems described herein to identify additional channels for their data in order to increase a level of distribution of the data. In another of these embodiments, and by way of example, a user may be distributing video for branding purposes (e.g., to increase a level of awareness about themselves, a company, an issue, or other topic) and may identify a first distribution channel for the video; by implementing the methods and systems described herein, however, the user may identify additional channels (e.g., channels not immediately obvious based on an analysis of the video) through which he can distribute the video for increased levels of distribution.

Figure 2A:
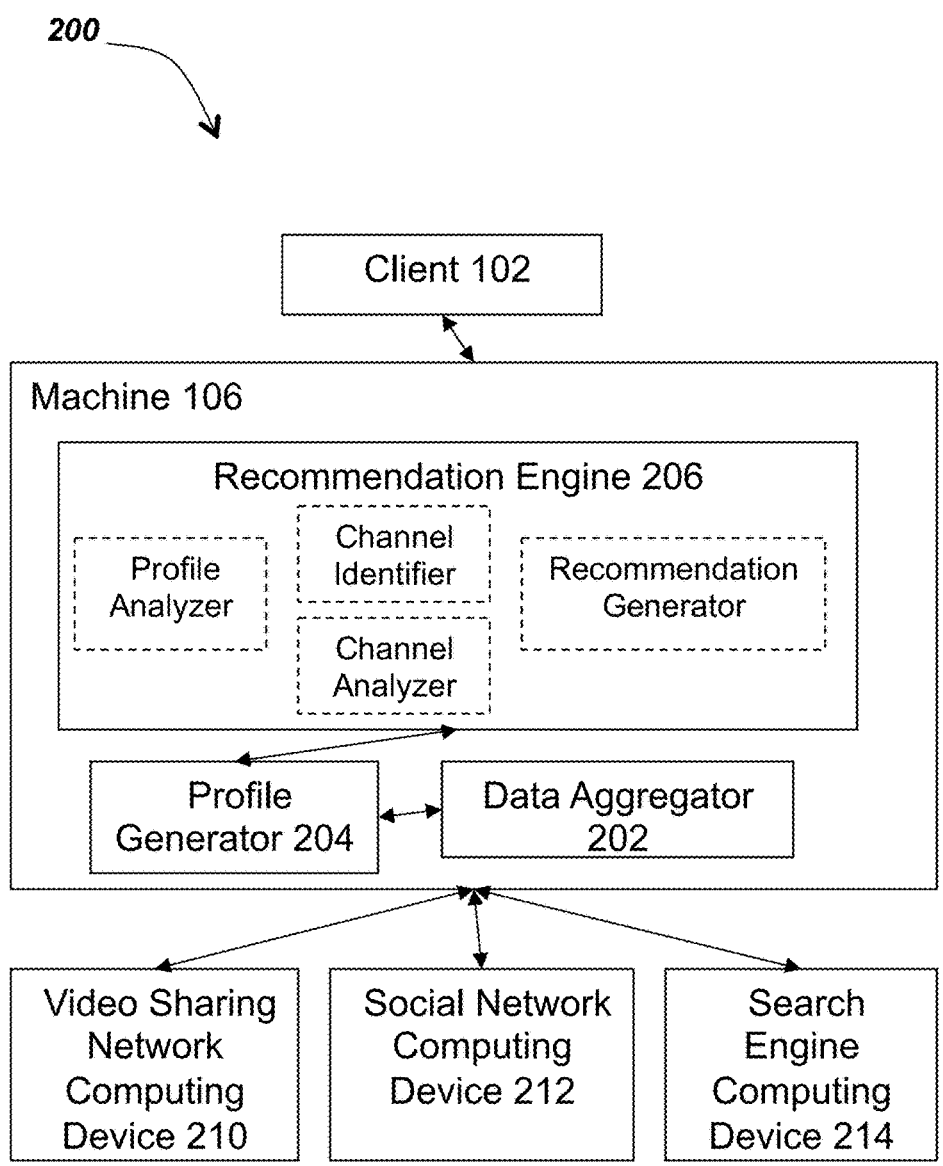
FIG. 2A is a block diagram depicting an embodiment of a distributed system for identifying distribution opportunities.

Referring now to FIG. 2A, a block diagram depicts one embodiment of a system 200 for identifying distribution opportunities. In brief overview, the system 200 includes a data aggregator 202, a profile generator 204, a recommendation engine 206, a video sharing network computing device 210, a social network computing device 212, a search engine computing device 214, a client 102, and a machine 106. The client 102 and the machine 106 may be provided as machine 100, as described in connection with FIGS. 1A-1C above.

In one embodiment, the data aggregator 202 executes on the machine 106. In another embodiment, the data aggregator 202 is provided as a software application. In still another embodiment, the data aggregator 202 is provided as a hardware application. In another embodiment, the data aggregator 202 includes a receiver. The receiver may receive data from the client 102 such as, without limitation, the identification of the video and the identification of the distribution channel of the video, or from other computing devices such as, without limitation, a video sharing network computing device 210, a social network computing device 212, or a search engine computing device 214. In still another embodiment, the data aggregator 202 includes a transmitter for sending requests for data stored on other computing devices. In some embodiments, the data aggregator 202 includes functionality for issuing requests in accordance with application programming interfaces (API). For example, the data aggregator 202 may include functionality for requesting data from a social network computing device 212, the request formatted according to an API made available by the social network computing device 212.

In one embodiment, the profile generator 204 executes on the machine 106. In another embodiment, the profile generator 204 is provided as a software application. In still another embodiment, the profile generator 204 is provided as a hardware application. In another embodiment, the profile generator 204 includes a receiver for receiving data from other components executing on the machine 106. In still another embodiment, the profile generator 204 includes functionality for storing data in and retrieving data from local or remote databases (not shown). In some embodiments, the profile generator 204 includes functionality for retrieving data from the data aggregator 202 and generating a profile of a type of data based upon the retrieved data.

In one embodiment, the recommendation engine 206 executes on the machine 106. In another embodiment, the recommendation engine 206 is provided as a software application. In still another embodiment, the recommendation engine 206 is provided as a hardware application. In another embodiment, the recommendation engine 206 includes functionality for retrieving a profile (e.g., from the profile generator 204 or from a database storing generated profiles). In still another embodiment, the recommendation engine 206 includes functionality for analyzing retrieved data. In yet another embodiment, the recommendation engine 206 includes functionality for identifying distribution channels and determining whether to recommend the use of the identified distribution channels for increasing a level of distribution of a particular piece of data. For example, and without limitation, the recommendation engine 206 may include a profile analyzer, a channel identifier, a channel analyzer, and a recommendation generator (depicted in shadow in FIG. 2A).

In one embodiment, the video sharing network computing device 210 is a computing device 106 associated with a video sharing network (e.g., a server owned or maintained or otherwise associated with the video sharing network). Video sharing networks may include, for example and without limitation, networks made available by YouTube, LLC of San Bruno, Calif., Vimeo, LLC of New York, N.Y., and Dailymotion, Societe Anonyme of Paris, France.

In one embodiment, the social networking computing device 212 is a computing device 106 associated with a social network (e.g., a server owned or maintained or otherwise associated with the social network). Social networks may include, for example and without limitation, networks made available by Facebook, Inc. of Menlo, Park, Calif.; Twitter, Inc. of San Francisco, Calif.; LinkedIn Corporation of Mountain View, Calif.; and Pinterest, Inc. of Palo Alto, Calif. In some embodiments, although video sharing networks and social networks may have common functionality (e.g., functionality for commenting on data shared by users) and while users of social networks may share data such as video, the predominant use of a social network need not be video sharing.

In one embodiment, the search engine computing device 214 is a computing device 106 associated with a search engine company (e.g., a server owned or maintained or otherwise associated with a company providing a public interface to a search engine). Search engines may include, for example and without limitation, the GOOGLE search engine made available by Google, Inc. of Mountain View, Calif.; the BING search engine made available by Microsoft Corporation of Redmond, Wash.; the YAHOO! search engine made available by Yahoo! Inc. of Sunnyvale, Calif.; and the METACRAWLER search engine made available by InfoSpace, Inc. of Bellevue, Wash. In some embodiments, although video sharing networks and search engines may have some common functionality (e.g., functionality for searching for a video shared by a user), the predominant use of a conventional search engine is not typically to share data but rather to find data. In other embodiments, a video sharing network may provide access to search engine functionality. In further embodiments, a social network may provide access to search engine functionality.

In one embodiment, the client 102 is associated with a user seeking additional distribution channels for data. For example, the user may have created a video and identified a first distribution channel for the video. However, by interacting with the components executing on machine 106 to implement the methods and systems described herein, the user may identify additional distribution channels in which to distribute the video. Although depicted in FIG. 2A as a distributed system in which the user accesses the client 102 to connect to the machine 106, in alternative embodiments, and as shown in FIG. 2B, the user accesses the machine 106 directly.

Figure 3:
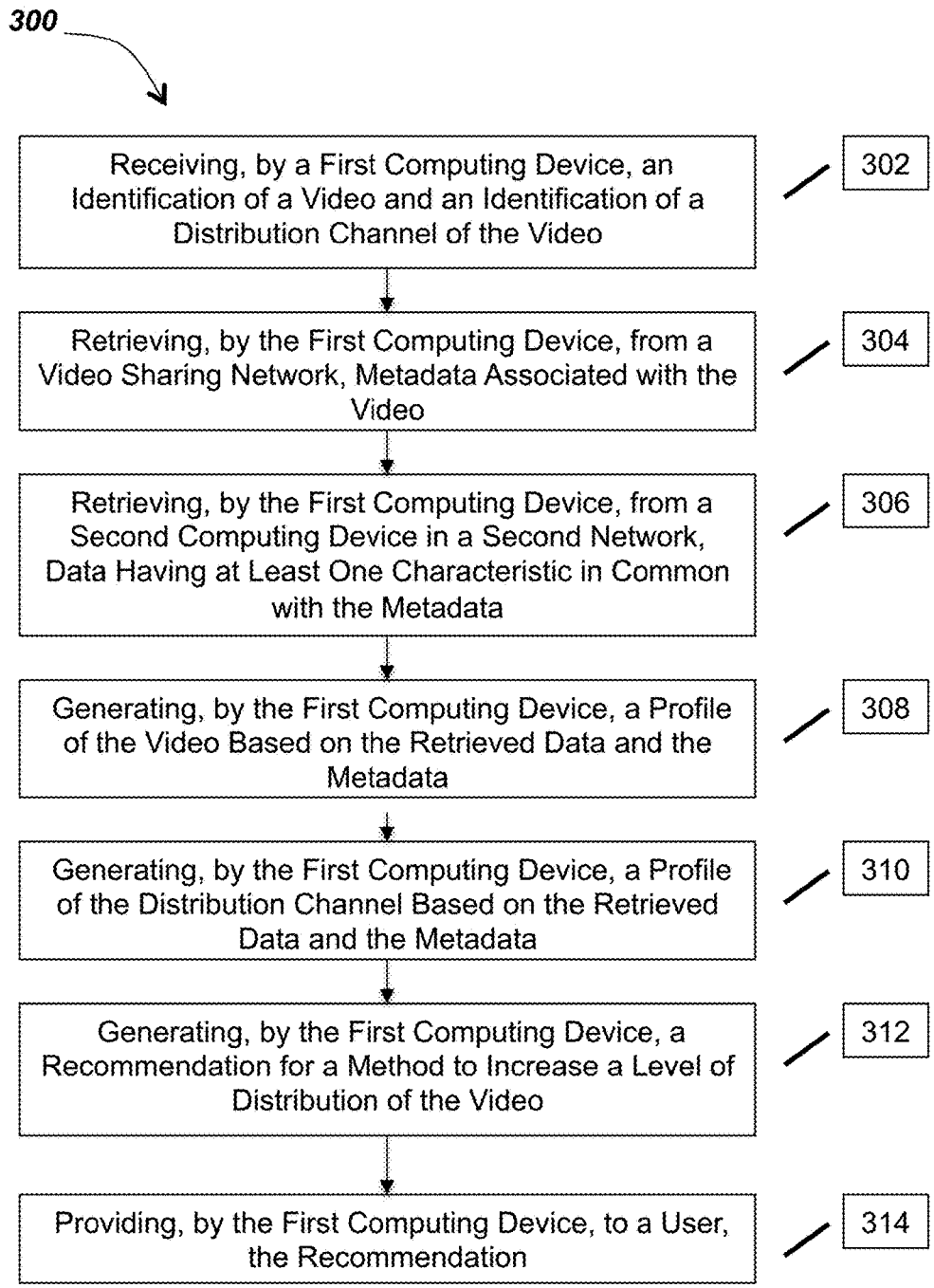
FIG. 3 is a flow diagram depicting an embodiment of a method for identifying distribution opportunities.

Referring now to FIG. 3, a flow diagram depicts one embodiment of a method 300 for identifying distribution opportunities. In brief overview, the method 300 includes receiving, by a first computing device, an identification of a video and an identification of a distribution channel of the video (302). The method 300 includes retrieving, by the first computing device, from a video sharing network, metadata associated with the video (304). The method 300 includes retrieving, by the first computing device, from a second computing device in a second network, data having at least one characteristic in common with the metadata (306). The method 300 includes generating, by the first computing device, a profile of the video based on the retrieved data and the metadata (308). The method 300 includes generating, by the first computing device, a profile of the distribution channel based on the retrieved data and metadata (310). The method 300 includes generating, by the first computing device, a recommendation for a method to increase a level of distribution of the video (312). The method 300 includes providing, by the first computing device, to a user, the recommendation (314).

Figure 2B:
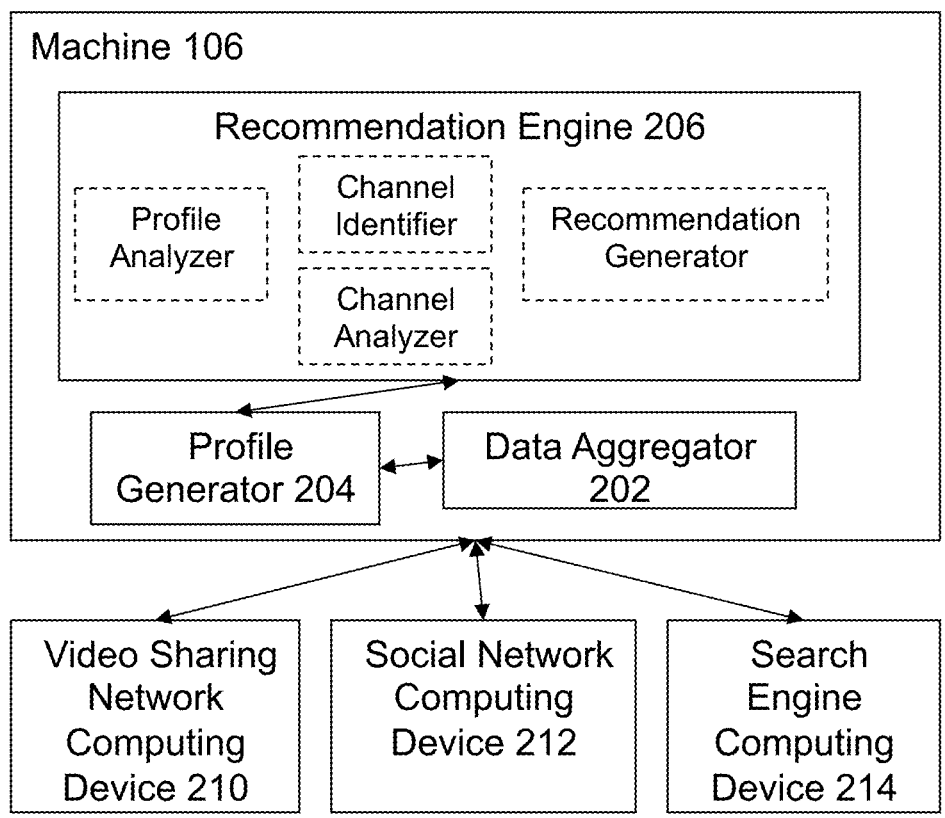
FIG. 2B is a block diagram depicting an embodiment of a system for identifying distribution opportunities.

Referring now to FIG. 3 in greater detail, and in connection with FIGS. 2A and 2B, the first computing device receives an identification of a video and an identification of a distribution channel of the video (302). In one embodiment, the machine 106 receives a copy of the video. In another embodiment, the machine 106 receives an identification of a computing device 106b hosting the video, such as a uniform resource locator (URL). In still another embodiment, the identification of the distribution channel is a URL. In yet another embodiment, the distribution channel is a channel on the video sharing network; for example, a themed channel where users upload videos having substantially similar content. In some embodiments, channels are defined by video metadata such as, without limitation, content, themes, topics, keywords, users, actors, producers, the form of technical delivery, and popularity.

In one embodiment, instead of receiving an identification of a video and an identification of a distribution channel of the video, the machine 106 receives metadata for use in identifying distribution opportunities. In such an embodiment, instead of using the identification of the video and the identification of the distribution channel of the video for retrieving metadata and performing the functionality described below, the machine 106 uses the received metadata to retrieve additional metadata and perform the functionality described below.

The first computing device retrieves, from a video sharing network, metadata associated with the video (304). In some embodiments, the data aggregator 202 retrieves the metadata. In one embodiment, the machine 106 analyzes the identified video to identify the metadata to retrieve. For example, in an embodiment in which the machine 106 retrieves a copy of the video, a video analysis component (not shown) analyzes the video file to identify metadata—such as, without limitation, keywords provided with the video. In another embodiment, the machine 106 receives the metadata from a user instead of, or in addition to, the identification of the video and the identification of the distribution channel. However, in other embodiments, the machine 106 does not receive the metadata from the user and instead transmits requests to other computing devices for the metadata. For example, the machine 106 may use an API to retrieve the metadata from the video sharing network computing device 210—for instance, using an API to retrieve comments viewers of the video wrote and uploaded to the distribution channel and analyzing the comments to identify keywords, sentiment, popularity, and other metadata.

In some embodiments, the retrieved metadata includes data about a distribution channel that displayed the video. In one of these embodiments, the retrieved metadata identifies a source from which traffic to the distribution channel originated. For example, the retrieved metadata may indicate whether traffic to the distribution channel originated from advertising displayed on another distribution channel. As another example, the retrieved metadata may indicate whether traffic to the distribution channel originated from a viewer clicking on a URL included in a mention of the video shared on a social network. As a further example, the retrieved metadata may identify a type of device from which a viewer of the video accessed the distribution channel (e.g., from a mobile computing device, from a desktop computing device, or from a tablet computing device). In one embodiment, the machine 106 analyzes the retrieved metadata and identifies, based on the analysis, a source from which traffic to the distribution channel originated; the machine 106 may then correlate the identified source with a characteristic of the distribution channel based upon the identified source and include an identification of the characteristic in the distribution channel profile 230. In such an embodiment, the channel-related metadata may provide additional information about the nature of a channel and its relevance to the video. For example, demographic data may be inferred from the channel-related metadata and used in providing a recommendation related to the video. As another example, the machine 106 may correlate one or more relevant characteristics, such as the popularity of a channel on a social media channel, with one or more types of traffic sources. The machine 106 may determine how to perform the correlation based on one or more requirements specified by a user of the system. For instance, a first advertiser might want to target young viewers between 13 and 25 and prefer video channels that have a large footprint on social media while a second advertiser might want to target men 35-55 who actively search for information about a certain type of product; the machine 106 may determine which characteristics are relevant and how to correlate relevant characteristics with a traffic source based on the requirements of the specific advertiser for which the machine 106 makes a recommendation.

Referring now to FIG. 2C, a screen shot depicts one embodiment of a plurality of aggregated metrics associated with a particular topic. In one embodiment, the machine 106 aggregates metrics for a plurality of channels and a plurality of videos identified by metadata. The aggregated metrics, such as traffic sources and demographic segments, provide additional information that the machine 106 may access in identifying additional distribution opportunities for the video.

Referring again to FIG. 3, the method 300 includes retrieving, by the first computing device, from a second computing device in a second network, data having at least one characteristic in common with the metadata (306). In some embodiments, the data aggregator 202 retrieves the data. In one embodiment, the machine 106 retrieves, from a search engine computing device 214, search data associated with the metadata. For example, the machine 106 may execute a search (e.g., by executing a script or using an API) on the search engine for metadata (e.g., for a keyword associated with a video) and determine how the search engine ranked the metadata, determine how many other people searched for the same metadata, or determine how popular the metadata is. In some embodiments, the data aggregator 202 retrieves and aggregates search data associated with the distribution channel. In other embodiments, the data aggregator 202 generates a list of videos and distribution channels that have at least one characteristic in common with the metadata based, at least in part, on the retrieved data.

In another embodiment, the first computing device retrieves, from a social network computing device 212, social network data associated with the metadata. For example, the machine 106 may retrieve, from a social network computing device 212, data indicating that a user of the social network shared the video on the social network and commented on it (e.g., indicated that he liked the video, didn't like the video, or had a comment about the video). In some embodiments, the data aggregator 202 retrieves the data. In other embodiments, the data aggregator 202 retrieves and aggregates social network data associated with the distribution channel. In one of these embodiments, the data aggregator 202 retrieves and aggregates data associated with both the metadata for the video and metadata for the distribution channel. In other embodiments, the data aggregator 202 retrieves and aggregates social network data associated with the video.

In some embodiments, the data aggregator 202 performs an initial analysis of data retrieved from the second computing device in the second network, the data having at least one characteristic in common with the metadata. In one of these embodiments, by way of example, the data aggregator 202 performs an analysis to determine whether to retrieve additional data. For example, the data aggregator may have retrieved data having at least one characteristic in common with the metadata (such as a similar keyword embedded in a comment, or a synonym of the metadata used as a keyword) and analyze the retrieved data to determine whether to retrieve additional data (such as, continuing with the example above, data associated with the synonym of the metadata). Based upon the initial analysis, the data aggregator 202 may determine to retrieve additional data; for instance, retrieving an identification of a second video associated with a keyword that is a synonym for the metadata. In some embodiments, and as will be discussed in additional detail below, the profile generator 204 and the recommendation engine 206 may also perform additional analyses of the data.

The first computing device generates a profile of the video based on the retrieved data and the metadata (308). In one embodiment, the profile generator 204 executing on the machine 106 generates the profile. In another embodiment, the profile generator 204 retrieves data and metadata from the data aggregator 204. In still another embodiment, the profile generator 204 retrieves data and metadata from a database storing the data and metadata.

Figure 2D:
FIG. 2D is a screen shot depicting one embodiment of a video profile.

Referring to FIG. 2D, a screen shot depicts one embodiment of a video profile 220. In the embodiment depicted by FIG. 2D, the video profile 220 includes a title, an image selected from the video, a length of the video, a number of individuals who have viewed the video, and a number of times viewers shared the video on one or more social networks.

Referring again to FIG. 3, and in one embodiment, the profile generator 204 generates a profile summarizing a level of popularity of the video. In another embodiment, the profile generator 204 generates a profile summarizing typical sentiments associated with the video (based, for example, upon how many users said they liked the video in a comment either in the distribution channel or in a second network). In still another embodiment, the profile generator 204 generates a user-friendly profile that may be provided to a user (e.g., the user that provided the identification of the video). In yet another embodiment, the profile generator 204 generates a profile that may be used by a software application for additional analysis (such as, by way of example, the recommendation engine 206). In a further embodiment, the profile generator 204 generates a profile including, without limitation, a title, at least one tag, a description, a length of the video, a publication date, a number of views the video received, popularity metrics (e.g., number of social sharing operations, number of comments, number of likes, and a number of dislikes), demographic data (e.g., the age groups that watched the video the most), sources of traffic to the video, identification of the channel in which the video published, and an identification of an author. In some embodiments, the profile generator 204 stores the profile (e.g., in a database accessible to the first computing device).

The first computing device generates a profile of the distribution channel based on the retrieved data and metadata (310). In one embodiment, the profile generator 204 executing on the machine 106 generates the profile. In another embodiment, the profile generator 204 retrieves data and metadata from the data aggregator 204. In still another embodiment, the profile generator 204 retrieves data and metadata from a database storing the data and metadata.

Figure 2E:
FIG. 2E is a screen shot depicting one embodiment of a distribution channel profile.

Referring now to FIG. 2E, a screen shot depicts one embodiment of a distribution channel profile 230. In the embodiment depicted in FIG. 2E, the distribution channel profile 230 includes a number of videos distributed in the channel, a number of views of any of the content distributed in the distribution channel, a number of distribution channel subscribers, a number of videos distributed in the distribution channel that have at least one characteristic in common with the metadata, a number of views of the relevant videos, a number of social sharing operations on the relevant videos (e.g., a number of likes/dislikes representing a sentiment level and a number of comments), demographic data (e.g., the age groups that visited the distribution channel the most), sources of traffic to the distribution channel, a uniform resource locator (URL) for the distribution channel, and any URLs referenced by the distribution channel (such as a URL for a publisher of content to the channel).

In some embodiments, the distribution channel profile 230 includes a description of at least one characteristic of the distribution channel that the profile generator 204 identified based upon an analysis of the retrieved data and metadata. In one of these embodiments, for example, the distribution channel profile 230 identifies a level of loyalty between a viewer of videos and the distribution channel based on a number of views by subscribers of distributed videos; the level of loyalty may be used in additional characteristics of the distribution channel, such as whether the distribution channel appeals to a particular demographic, is associated with a particular product or service brand, or is irrelevant, all of which may inform a decision to recommend one distribution opportunity over another. As another example, the distribution channel profile 230 identifies a level of importance of social sharing to viewers of videos on the distribution channel based on a number of social sharing operations. As another example, the distribution channel profile 230 identifies a level of engagement of viewers of videos on the distribution channel based on the number of social sharing operations. The retrieved data and metadata include, as described above (e.g., in connection with FIG. 2D), popularity metrics, social sharing operations, number of views, number of subscribers, the statistical distribution of the lengths of videos in the distribution channel, demographic data, sources of traffic to the distribution channel, and other metrics from which additional channel characteristics may be derived.

Referring now to FIG. 2F, a screen shot depicts one embodiment of a display of a plurality of traffic sources used by a particular distribution channel. As depicted in FIG. 2F, distribution channel profile 230 may include a description of retrieved data and metadata, such as the traffic sources shown in FIG. 2F.

Figure 2G:
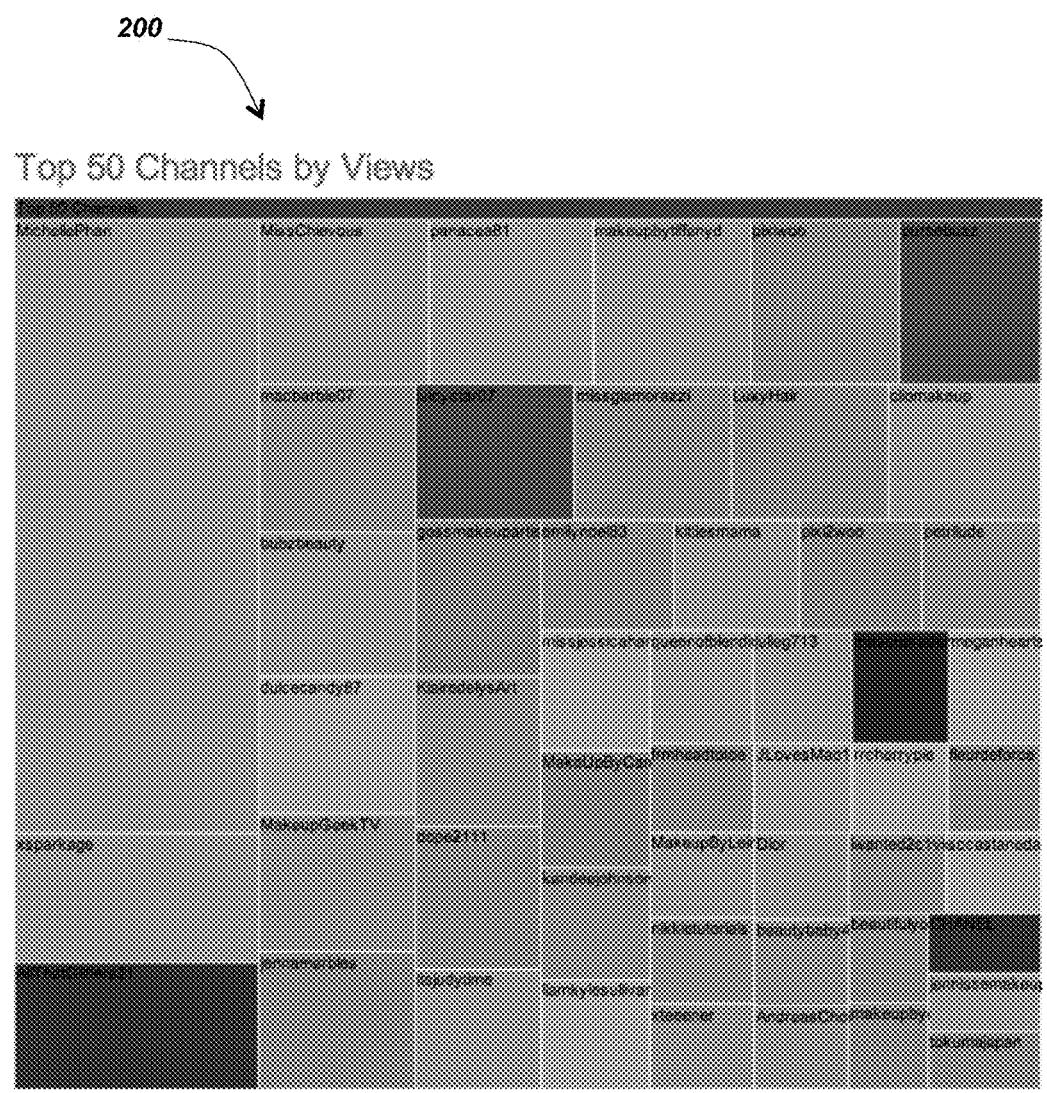
FIG. 2G is a screen shot depicting an embodiment displaying a visualization of a plurality of distribution channels sorted by user-specified criteria.

Referring now to FIG. 2G, a screen shot depicts an embodiment displaying a visualization of a plurality of distribution channels sorted by user-specified criteria. As shown in FIG. 2G, and by way of example, without limitation, the system 200 generates a visualization of the top 50 distribution channels sorted by total views for a particular topic. In some embodiments, a size of the squares in the visualization indicates a number of views of the video. In other embodiments, a shading, pattern, or color of the squares in the visualization indicates the sentiment of at least one viewer of the distribution channel with respect to the distribution channel's content, ranging from mostly negative to mostly positive.

Figure 2H:
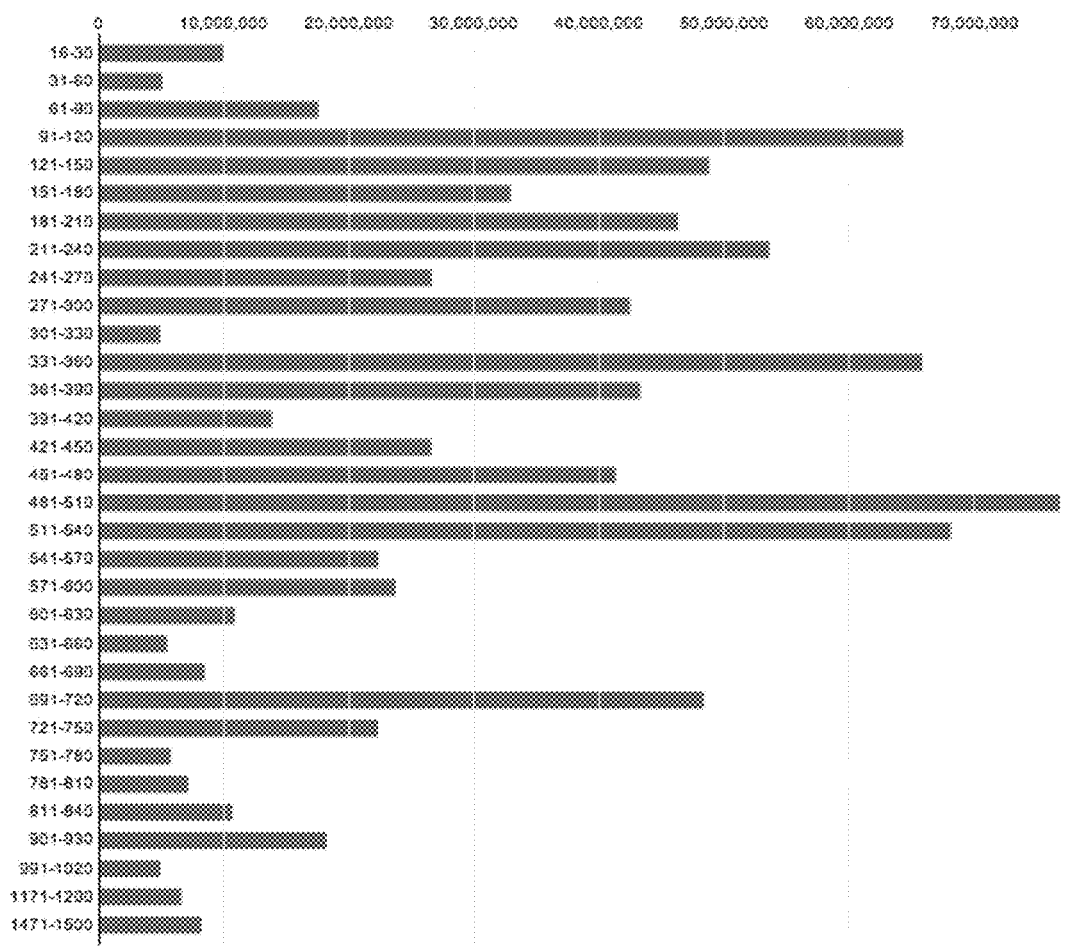
FIG. 2H is a screen shot depicting one embodiment of a display of video view distribution by length.
Figure 21:
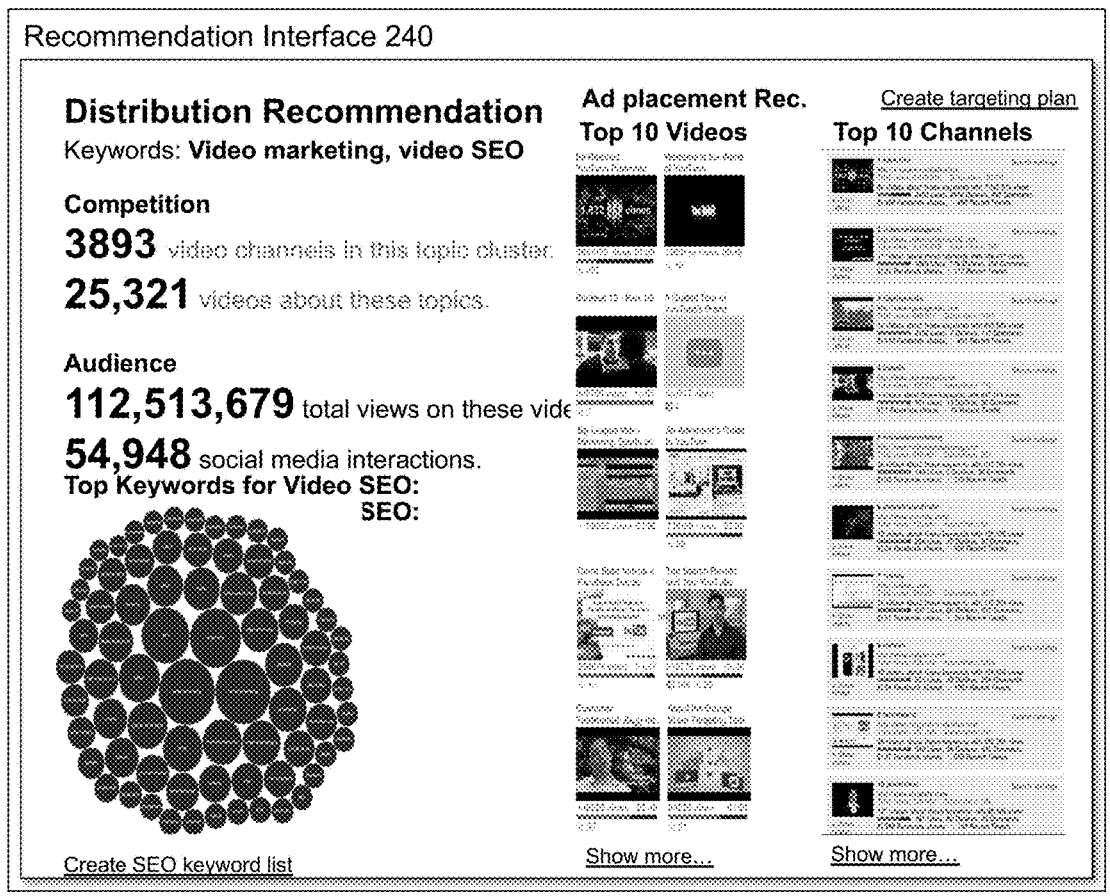

Referring now to FIG. 2H, a screen shot depicts one embodiment of a display of video view distribution by length. As shown in FIG. 2H, the machine 106 may generate analyses of various attributes of videos in distribution channels and use the results of those analyses in generating recommendations for additional distribution opportunities. In the example shown in FIG. 2H, analysis of the distribution of video lengths for a particular group of channels may be relevant to generation of recommendations because particular users (e.g., advertisers) may choose to use channels that provide more in-depth (e.g., longer) content over those that have only superficial content.

Referring again to FIG. 3, and in one embodiment, the profile generator 204 generates an enumeration of keywords used by at least one other video on the distribution channel, which may be, for example, a second video having at least one characteristic in common with the metadata. In another embodiment, the profile generator 204 analyzes the metadata and builds a list of n-gram, multi-word expressions that describe the metadata of the distribution channel. In still another embodiment, the profile generator 204 builds the list of n-gram, multi-word expressions based on, without limitation, titles, tags, descriptive texts, and user comments. In yet another embodiment, the profile generator 204 applies a weight to an entry in the list of n-gram, multi-word expressions, calculated by factors including a frequency of the expression, a number of different videos that use the expression, and a position of the expression in the metadata.

The first computing device generates a recommendation for a method to increase a level of distribution of the video (312). In some embodiments, the recommendation engine 206 generates the recommendation. In one embodiment, the recommendation engine 206 generates the recommendation based at least in part upon an analysis of the profile of the video. In another embodiment, the recommendation engine 206 generates the recommendation based at least in part upon an analysis of the profile of the distribution channel.

In one embodiment, the recommendation engine 206 analyzes the profile of the video. In another embodiment, the recommendation engine 206 analyzes the profile of the distribution channel. In still another embodiment, a sub-component of the recommendation engine 206 performs the analyses (e.g., the profile analyzer depicted in shadow in FIGS. 2A and 2B). In some embodiments, the recommendation engine 206 analyzes newly-generated profiles and previously-aggregated data; for example, the recommendation engine 206 analyzes data that the data aggregator 202 aggregated based on the metadata identified in connection with a request to identify distribution opportunities for a first video. By comparing newly-generated profiles with previously-aggregated data, the recommendation engine 206 can determine which channels show a particularly high degree of activity in the recent past such as a strong growth in the number of views, the number of new subscribers, or of other metrics that might be relevant to determining a recommendation for a particular video. However, in other embodiments, the recommendation engine 206 analyzes previously-generated profiles and previously-aggregated data; for example, the recommendation engine 206 may determine that data aggregated based on metadata identified in connection with a first video is relevant to an analysis and identification of distribution opportunities for a second video and may analyze previously-aggregated data.

In one embodiment, the recommendation engine 206 identifies at least one channel adjacent to the distribution channel based, at least in part, on an analysis of at least one of the profile of the video and the profile of the distribution channel. In some embodiments, the recommendation engine 206 analyzes each piece of data aggregated by the data aggregator 202 in order to identify the at least one adjacent channel, iterating through the data. In one of these embodiments, the data aggregator 202 has already performed an initial analysis of the aggregated data and the recommendation engine 206 performs a second analysis. In another embodiment, the recommendation engine 206 identifies the at least one adjacent channel by executing a search of a second computing device (e.g., the video sharing network computing device 210, the social network computing device 212, or the search engine computing device 214) for channels associated with a characteristic identified in the profile of the video or associated with a characteristic identified in the profile of the distribution channel. In still another embodiment, a sub-component of the recommendation engine 206 identifies the at least one adjacent channel (e.g., the channel identifier depicted in shadow in FIGS. 2A and 2B).

In some embodiments, the recommendation engine 206 identifies the at least one adjacent channel by analyzing a level of relatedness between the at least one adjacent channel and the distribution channel. In one of these embodiments, the recommendation engine 206 determines that a high degree of overlap exists between metadata associated with the two channels (e.g., the keywords, tags, demographic profile, or other metadata associated with the two channels). In another of these embodiments, the recommendation engine 206 determines that the at least one adjacent channel is related to the distribution channel based upon an explicitly defined relation, such as a subscription relationship between an owner of the distribution channel and the adjacent channel, or vice versa.

In some embodiments, the recommendation engine 206 identifies the at least one adjacent channel indirectly. In one of these embodiments, the recommendation engine 206 identifies a second video based on the analyses of the profile of the video and of the profile of the distribution channel. In another of these embodiments, the recommendation engine 206 identifies a second distribution channel associated with the second video.

In one embodiment, the recommendation engine 206 determines that the at least one channel adjacent to the distribution channel has at least one characteristic in common with the distribution channel. For example, the adjacent channel may have a common topic, theme, classification, or other characteristic in common with the distribution channel. In another embodiment, the recommendation engine 206 transmits an identification of the adjacent channel to the profile generator 204, which generates a profile of the adjacent channel; the recommendation engine 206 analyzes the generated profile of the adjacent channel to determine whether the adjacent channel has at least one characteristic in common with the distribution channel. In some embodiments, a sub-component of the recommendation engine 206 performs the analysis of the adjacent channel to determine whether the adjacent channel has at least one characteristic in common with the distribution channel (e.g., the channel analyzer depicted in shadow in FIGS. 2A and 2B). In other embodiments, to determine that the at least one adjacent channel has at least one characteristic in common with the distribution channel, the recommendation engine 206 retrieves a score for the at least one adjacent channel. In one of these embodiments, the recommendation engine 206 analyzes a score based on a plurality of weighted factors. Factors may include, by way of example, and without limitation, a number of views the channel has, a number of subscribers, a level of user sentiment for the channel, a level of social media popularity of the channel (e.g., a number of sharing operations), the demographic profile of the channel, the sources of traffic to the channel, the distribution of length of the videos on the channel, and a degree of overlap between the original distribution channel and the at least one adjacent channel based on a weighted list of n-gram, multi-word expressions.

In one embodiment, the recommendation engine 206 determines that distributing the video on the adjacent channel could enhance a level of distribution of the video. In another embodiment, the recommendation engine 206 makes the determination based upon, without limitation, an analysis of the score for the adjacent channel as described above. In still another embodiment, and by way of example, the recommendation engine 206 may determine that the distribution channel and the adjacent channel are two separate channels but attract similar users, have similar themes, distribute videos or other data of similar content, or have another characteristic in common that would improve a level of distribution of the video. In another embodiment, the recommendation engine 206 determines that distributing the video on the adjacent channel would increase a number of viewers of the video. In still another embodiment, the recommendation engine 206 calculates a predicted increase in the number of viewers of the video based on previous viewer numbers of the adjacent channel and viewer numbers of comparable videos. In still another embodiment, the recommendation engine 206 determines that distributing the video on the adjacent channel would increase an amount of traffic to a web site associated with the video. In yet another embodiment, a sub-component of the recommendation engine 206 makes the determination and generates the recommendation based upon the determination (e.g., the recommendation generator depicted in shadow in FIGS. 2A and 2B).

In one embodiment, the recommendation engine 206 may determine that placing an advertisement on the adjacent channel could enhance a level of distribution of the video. In another embodiment, the recommendation engine 206 may determine that promotion on a freely accessible social channel could enhance a level of distribution of the video. In still another embodiment, the recommendation engine 206 may determine that other forms of activity such as, without limitation, social interaction (e.g., commenting) and commercial distribution deals, could enhance a level of distribution of the video. In yet another embodiment, the recommendation engine 206 may identify an indirect form of activity that could enhance a level of distribution of the video such as, without limitation, video search engine optimization (SEO) in which revising keyword strategies to match strategies of the adjacent channel may enhance the level of distribution. In some embodiments, the recommendation engine 206 generates content and marketing ideas from the recommendation, going beyond simply identifying distribution opportunities. In one of these embodiments, by way of example, the recommendation engine 206 may determine, based at least in part on data identified by the system, that people interested in a particular product seem to like a particular type of content (e.g., without limitation, tutorial videos), and may determine to recommend the production of similar types of content. In yet another embodiment, the recommendation engine 206 may determine, based at least in part on data identified by the system, that people interested in a particular topic prefer videos of a certain length (e.g., without limitation, shorter clips of one minute or less, or longer educational content of 10 minutes of more) and may recommend the production of videos of a similar length. In yet another embodiment, the recommendation engine 206 may determine, based at least in part on data identified by the system, that people in a certain demographic group are interested in particular types of content. In some embodiments, the recommendation engine 206 may combine several of the identified factors, such as topics people are interested in, the demographic group they belong to, or products they are interested in, to determine what type of content these people prefer, or that these people prefer videos of a certain length.

The first computing device provides, to a user, the recommendation (314). In one embodiment, the machine 106 transmits the recommendation to the client 102 associated with the user (as shown in FIG. 2B). In another embodiment, the machine 106 generates a display of the recommendation for a local user.

Referring now to FIG. 2I, a screen shot depicts one embodiment of a recommendation interface 240. In the embodiment depicted in FIG. 2I, the recommendation interface 240 includes an identification of at least some of the metadata (e.g., "Keywords: Video marketing, video SEO"), an identification of advertising placement recommendations, and an identification of additional distribution channels in which to distribute the video, as well as interface options for requesting additional information (e.g., "Show more," "Create SEO keyword list," and "Create targeting plan").

In some embodiments, the recommendation interface 240 provides not just a recommendation but additional information underlying the decision to recommend a particular distribution opportunity. For example, the recommendation may include some or all of the information stored in a distribution channel profile 230 including, for example, a description of at least one characteristic of the distribution channel that the profile generator 204 inferred from retrieved data and metadata (such as brand loyalty, engagement, and influence).

Although described herein in connection with identifying distribution opportunities for videos, those of ordinary skill in the art will recognize that the methods and systems described herein may be used in connection with identifying distribution opportunities for other types of data. For example, the methods and systems described herein may be implemented to identify distribution opportunities for media objects generally. As one example, the methods and systems described herein may identify distribution opportunities for photographs, music, and other media objects.

Figure 4:
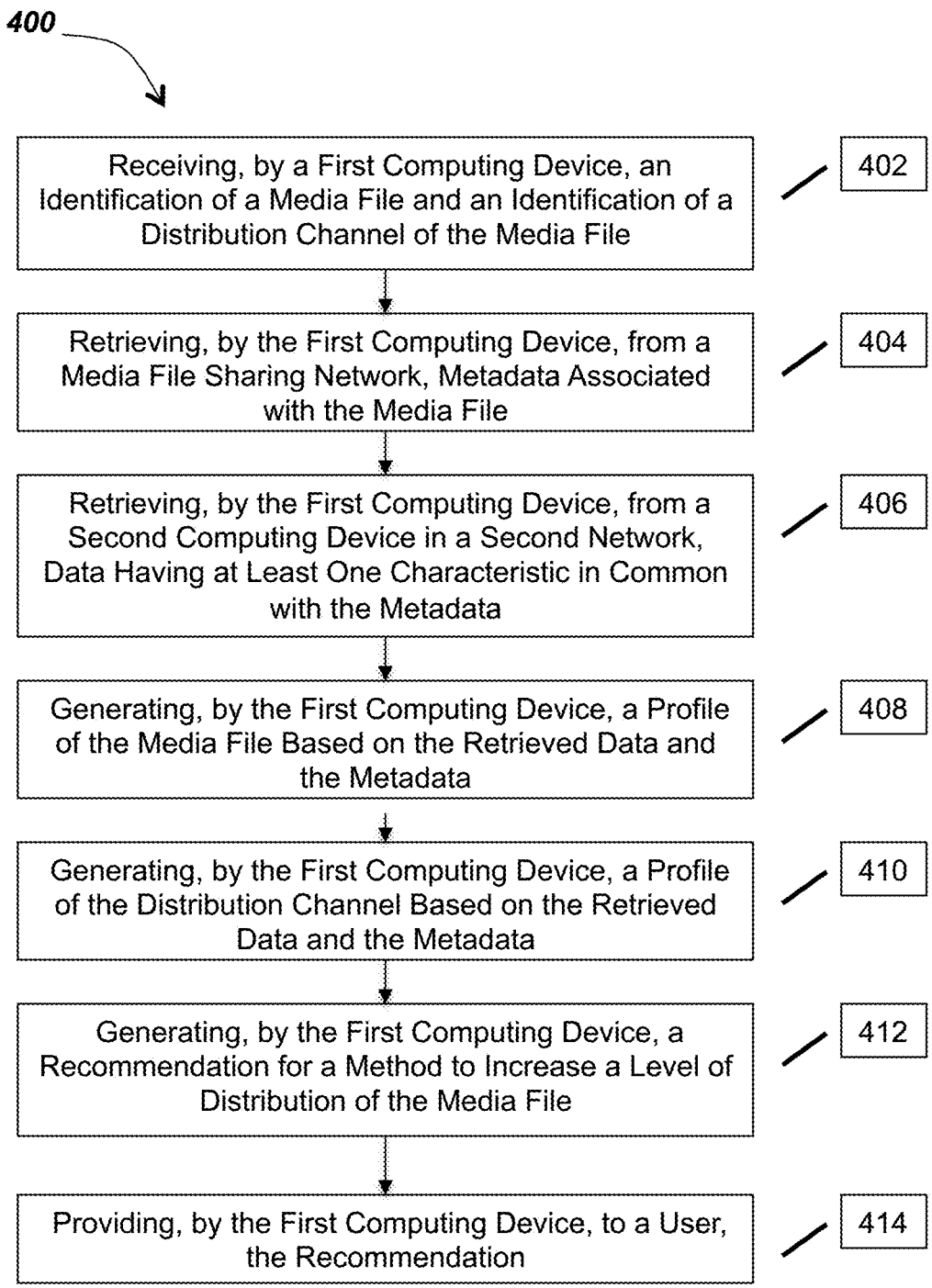
FIG. 4 is a flow diagram depicting an embodiment of a method for identifying media file distribution opportunities.

Referring now to FIG. 4, a flow diagram depicts one embodiment of a method 400 for identifying distribution opportunities. In brief overview, the method 400 includes receiving, by a first computing device, an identification of a media file and an identification of a distribution channel of the media file (402). The method 400 includes retrieving, by the first computing device, from a media file sharing network, metadata associated with the media file (404). The method 400 includes retrieving, by the first computing device, from a second computing device in a second network, data having at least one characteristic in common with the metadata (406). The method 400 includes generating, by the first computing device, a profile of the media file based on the retrieved data and the metadata (408). The method 400 includes generating, by the first computing device, a profile of the distribution channel based on the retrieved data and metadata (410). The method 400 includes generating, by the first computing device, a recommendation for a method to increase a level of distribution of the media file (412). The method 400 includes providing, by the first computing device, to a user, the recommendation (414).

A first computing device receives an identification of a media file and an identification of a distribution channel of the media file (402). As described above in connection with FIG. 3, the first computing device may receive an identification of a video and an identification of a distribution channel of the video. However, those of ordinary skill in the art understand that the method is not limited to a specific type of media file. In some embodiments, for example, the first computing device receives an identification of a digital photograph and an identification of a distribution channel of the digital photograph. Distribution channels for digital photographs may include, by way of example and without limitation, the Instagram web site maintained by Instagram, LLC of Menlo Park, Calif.; the Flickr web site maintained by Yahoo! Inc. of Sunnyvale, Calif.; and the Pinterest web site maintained by Pinterest, Inc. of Palo Alto, Calif. In other embodiments, the first computing device receives an identification of a digital music file and an identification of a distribution channel of the digital music file. Distribution channels for digital music files may include, by way of example and without limitation, the SoundCloud web site maintained by SoundCloud Limited of Berlin, Germany, and the MySpace web site maintained by MySpace, LLC of Beverly Hills, Calif.

The first computing device retrieves, from a media file sharing network, metadata associated with the media file (404). The first computing device may retrieve the metadata from the media file sharing network as described above in connection with FIG. 3. The first computing device may identify a media file sharing network from which to retrieve the metadata based on a type of the media file. For example, the machine 106 may identify a photo sharing site when the media file is a digital photograph, while identifying a video sharing site when the media file is a video. Those of ordinary skill in the art will understand that the machine 106 may analyze media files of different types in substantially similar ways, allowing the machine 106 to determine which media file sharing network to access in order to retrieve the metadata regardless of what type of media file is at issue.

The first computing device retrieves, from a second computing device in a second network, data having at least one characteristic in common with the metadata (406). The first computing device may retrieve the data from the second network as described above in connection with FIG. 3.

The first computing device generates a profile of the media file based on the retrieved data and the metadata (408). The first computing device may generate the profile as described above in connection with FIG. 3.

The first computing device generates a profile of the distribution channel based on the retrieved data and the metadata (410). The first computing device may generate the profile as described above in connection with FIG. 3.

The first computing device generates a recommendation for a method to increase a level of distribution of the media file (412). The first computing device may generate the recommendation as described above in connection with FIG. 3.

The first computing device provides, to a user, the recommendation (414). The first computing device may provide the recommendation as described above in connection with FIG. 3.

It should be understood that the systems described above may provide multiple ones of any or each of the described components and that these components may be provided on either a standalone machine or, in some embodiments, on multiple machines in a distributed system. It should also be understood that phrases such as "based on" and "based upon" do not imply "based exclusively on" and instead generally mean that the particular feature, structure, step, or characteristic is based at least in part on the specified element. Further, the phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, Python, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for identifying distribution opportunities based on adjacent keywords, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A computer-implemented method comprising:
receiving, by a first computing device, an identification of metadata of a video, the received metadata including at least one keyword;
retrieving, by the first computing device, from a video sharing network, second metadata of the video based on the received metadata, wherein the video sharing network includes at least one distribution channel for distributing the video for display on a viewer computing device, and wherein the second metadata includes at least one description of a characteristic of at least one of the video and the at least one distribution channel;
retrieving, by the first computing device, from a second computing device in a second network different from the video sharing network, data having at least one characteristic in common with at least one of the received metadata, and the retrieved second metadata;
generating, by the first computing device, a profile of the video based on the received metadata, the retrieved data, and the retrieved second metadata;
generating, by the first computing device, a profile of the at least one distribution channel based on the received metadata, the retrieved data, and the received second metadata;
analyzing, by the first computing device, the profile of the video;
analyzing, by the first computing device, the profile of the distribution channel;
identifying, by the first computing device, at least one channel adjacent to the distribution channel based on the analyses, wherein identifying further comprises:
searching for the at least one channel adjacent to the distribution channel, in the video sharing network, having at least one characteristic in common with at least one characteristic identified in at least one of the profile of the video and the profile of the distribution channel;
generating, by the first computing device, a recommendation for a method to increase a level of distribution of the video, wherein the recommendation includes distributing the video in the at least one channel adjacent to the distribution channel based on the analyses and channel identification; and
providing, by the first computing device, to a user, the recommendation.

2. The method of claim 1, wherein retrieving from the second computing device further comprises retrieving, by the first computing device, from a search engine computing device, search data having at least one characteristic in common with the metadata.

3. The method of claim 1, wherein retrieving from the second computing device further comprises retrieving, by the first computing device, from at least one social network, social network data having at least one characteristic in common with the metadata.

4. The method of claim 1, wherein generating the profile of the distribution channel further comprises:
identifying, by the first computing device, a characteristic of the distribution channel based upon the retrieved metadata and the retrieved data having at least one characteristic in common with the metadata; and
including, by the first computing device, an identification of the characteristic in the profile of the distribution channel.

5. The method of claim 1, wherein generating the recommendation further comprises:

identifying, by the first computing device, a second video based on the analyses and searching the video sharing network;

identifying, by the first computing device, a second distribution channel in the video sharing network distributing the second video for display of the second video on a viewer computing device, wherein the second distribution channel has at least one characteristic in common with at least one of the profile of the video and the profile of the distribution channel; and generating a recommendation to distribute the video in the second distribution channel.

6. The method of claim 1 further comprising:

analyzing, by the first computing device, the second metadata retrieved from the video sharing network; and identifying, by the first computing device, based on the analysis, a source from which traffic to the distribution channel originated.

7. The method of claim 6, wherein generating the profile of the distribution channel further comprises:

correlating, by the first computing device, the identified source with a characteristic of the distribution channel based upon the identified source; and including, by the first computing device, an identification of the characteristic in the profile of the distribution channel.

8. A non-transitory, computer readable medium comprising computer program instructions tangibly stored on the computer readable medium, wherein the computer program instructions are executable by at least one computer processor to perform a method, the method comprising:

receiving, by a first computing device, an identification of metadata of a video, the received metadata including at least one keyword;

retrieving, by the first computing device, from a video sharing network, second metadata of the video, based on the received metadata, wherein the video sharing network includes at least one distribution channel for distributing the video for display on a viewer computing device, and wherein the second metadata includes at least one description of a characteristic of at least one of the video and the distribution channel;

retrieving, by the first computing device, from a second computing device in a second network different from the video sharing network, data having at least one characteristic in common with the at least one of the received metadata and the retrieved second metadata;

generating, by the first computing device, a profile of the video based on the received metadata, the retrieved data, and the retrieved second metadata;

generating, by the first computing device, a profile of the distribution channel based on the received metadata, the retrieved data, and the retrieved second metadata;

analyzing, by the first computing device, the profile of the video;

analyzing, by the first computing device, the profile of the distribution channel;

identifying, by the first computing device, at least one channel adjacent to the distribution channel based on the analyses, wherein identifying further comprises:

searching for the at least one channel adjacent to the distribution channel, in the video sharing network, having a characteristic identified in at least one of the profile of the video and the profile of the distribution channel;

generating, by the first computing device, a recommendation for a method to increase a level of distribution of the video, wherein the recommendation includes distributing the video in the at least one channel adjacent to the distribution channel based on the analyses and channel identification; and providing, by the first computing device, to a user, the recommendation.

9. A computer-implemented method comprising:

receiving, by a first computing device, an identification of metadata of a media file, the received metadata including at least one keyword;

retrieving, by the first computing device, from a first network including at least one distribution channel for the media file, second metadata of the media file based on the received metadata, and wherein the second metadata includes at least one description of a characteristic of at least one of the media file and the at least one distribution channel;

retrieving, by the first computing device, from a second computing device in a second network different from the first network, data having at least one characteristic in common with at least one of the received metadata, and the retrieved second metadata;

generating, by the first computing device, a profile of the media file based on the received metadata, the retrieved data, and the retrieved second metadata;

generating, by the first computing device, a profile of the at least one distribution channel based on the received metadata, the retrieved data, and the received second metadata;

analyzing, by the first computing device, the profile of the media file;

analyzing, by the first computing device, the profile of the distribution channel;

identifying, by the first computing device, at least one channel adjacent to the distribution channel based on the analyses, wherein identifying further comprises:

searching for the at least one channel in the second network, having at least one characteristic in common with at least one characteristic identified in at least one of the profile of the media file and the profile of the distribution channel;

generating, by the first computing device, a recommendation for a method to increase a level of distribution of the media file, wherein the recommendation includes distributing the media file in the at least one channel in the second network, based on the analyses and channel identification; and providing, by the first computing device, to a user, the recommendation.

* * * * *

UNITED STATES PATENT AND TRADEMARK OFFICE
CERTIFICATE OF CORRECTION

PATENT NO.        : 10,063,926 B2                              Page 1 of 1
APPLICATION NO.   : 15/239861
DATED             : August 28, 2018
INVENTOR(S)       : Hein et al.

It is certified that error appears in the above-identified patent and that said Letters Patent is hereby corrected as shown below:

In the Specification

In Column 1, Line 14, delete "Opportunities,"" and insert -- Opportunities," now Pat. No. 9,449,089, --, therefor.

In Column 12, Line 12, delete "data aggregator 204." and insert -- data aggregator 202. --, therefor.

In Column 12, Line 52, delete "data aggregator 204." and insert -- data aggregator 202. --, therefor.

Signed and Sealed this
Eleventh Day of December, 2018

Andrei Iancu
*Director of the United States Patent and Trademark Office*